(12) United States Patent
Yamakawa et al.

(10) Patent No.: US 10,110,067 B2
(45) Date of Patent: Oct. 23, 2018

(54) POWER TRANSMISSION SYSTEM

(71) Applicant: EQUOS RESEARCH CO., LTD., Tokyo (JP)

(72) Inventors: Hiroyuki Yamakawa, Hokkaido (JP); Kenichiro Sato, Tokyo (JP)

(73) Assignee: EQUOS RESEARCH CO., LTD., Tokyo (JP)

( * ) Notice: Subject to any disclaimer, the term of this patent is extended or adjusted under 35 U.S.C. 154(b) by 367 days.

(21) Appl. No.: 14/433,771

(22) PCT Filed: Oct. 29, 2013

(86) PCT No.: PCT/JP2013/079236
§ 371 (c)(1),
(2) Date: Apr. 6, 2015

(87) PCT Pub. No.: WO2014/069445
PCT Pub. Date: May 8, 2014

(65) Prior Publication Data
US 2015/0280445 A1  Oct. 1, 2015

(30) Foreign Application Priority Data

Oct. 31, 2012 (JP) ................. 2012-241147

(51) Int. Cl.
*H01F 37/00* (2006.01)
*H02J 50/12* (2016.01)
(Continued)

(52) U.S. Cl.
CPC ............. *H02J 50/12* (2016.02); *B60L 11/182* (2013.01); *B60L 11/1824* (2013.01);
(Continued)

(58) Field of Classification Search
CPC ............. B60L 11/182; B60L 11/1824; B60L 11/1846; B60L 2210/30; B60L 2210/40;
(Continued)

(56) References Cited

U.S. PATENT DOCUMENTS

2009/0284082 A1  11/2009  Mohammadian
2010/0164296 A1*  7/2010  Kurs ................. H01Q 1/248
                                                    307/104

(Continued)

FOREIGN PATENT DOCUMENTS

CN    102280945 A    12/2011
CN    102738908 A    10/2012
(Continued)

OTHER PUBLICATIONS

Jun. 10, 2016 Search Report issued in European Patent Application No. 13850890.8.
(Continued)

*Primary Examiner* — Rexford Barnie
*Assistant Examiner* — Toan Vu
(74) *Attorney, Agent, or Firm* — Oliff PLC

(57) ABSTRACT

A power transmission system that can prevent a plunge in power transmission efficiency even when there is a positional shift of a power reception antenna with respect to a power transmission antenna. A power transmission system includes: a power transmission antenna that includes a wound power transmission coil that is placed on the ground; a power reception antenna that is disposed in such a way as to face the power transmission antenna, includes a wound power reception coil, and receives electric energy from the power transmission antenna via an electromagnetic field, wherein an area of a first projection plane that is formed by the power transmission coil in a vertical direction with respect to a horizontal plane is larger than an area of a (Continued)

second projection plane that is formed by the power reception coil in the vertical direction with respect to the horizontal plane.

2 Claims, 10 Drawing Sheets

(51) Int. Cl.
*H02J 7/02* (2016.01)
*H01F 38/14* (2006.01)
*B60L 11/18* (2006.01)
*H01F 27/36* (2006.01)
*H02J 17/00* (2006.01)

(52) U.S. Cl.
CPC .......... *B60L 11/1846* (2013.01); *H01F 27/36* (2013.01); *H01F 38/14* (2013.01); *H02J 7/025* (2013.01); *H02J 17/00* (2013.01); *B60L 2210/10* (2013.01); *B60L 2210/30* (2013.01); *B60L 2210/40* (2013.01); *B60L 2250/12* (2013.01); *B60L 2250/16* (2013.01); *B60L 2270/147* (2013.01); *Y02T 10/7005* (2013.01); *Y02T 10/7072* (2013.01); *Y02T 10/7216* (2013.01); *Y02T 10/7241* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ............. B60L 2250/12; B60L 2250/16; B60L 2270/147; H01F 27/36; H01F 38/14; H02J 5/005; H02J 2210/10; Y02T 10/7005; Y02T 10/7072; Y02T 10/7216; Y02T 10/7241; Y02T 90/121
USPC .......................................................... 307/82
See application file for complete search history.

(56) References Cited

U.S. PATENT DOCUMENTS

| | | | |
|---|---|---|---|
| 2011/0114401 A1 | 5/2011 | Kanno | |
| 2011/0273025 A1 | 11/2011 | Amano et al. | |
| 2012/0212069 A1* | 8/2012 | Kawano | H02J 5/005 307/104 |
| 2012/0262002 A1* | 10/2012 | Widmer | H04B 5/0037 307/104 |

FOREIGN PATENT DOCUMENTS

| | | | |
|---|---|---|---|
| DE | 102009013694 A1 | | 9/2010 |
| EP | 2428969 A2 | | 3/2012 |
| JP | 2008-289241 A | | 11/2008 |
| JP | 2008289241 A | * | 11/2008 |
| JP | 2009-501510 A | | 1/2009 |
| JP | 2010-068657 A | | 3/2010 |
| JP | 2010-098257 A | | 4/2010 |
| JP | 2011-524729 A | | 9/2011 |
| JP | 2012-210118 A | | 10/2012 |
| WO | 2007/008646 A2 | | 1/2007 |

OTHER PUBLICATIONS

Jan. 14, 2014 International Search Report issued in International Patent Application No. PCT/JP2013/079236.

* cited by examiner

Coupling coefficient K

Equivalent circuit (A)

(B)

(C)

First projection plane (A)

Second projection plane (B)

(C)

(D)

POWER TRANSMISSION SYSTEM

TECHNICAL FIELD

The present invention relates to a power transmission system that wirelessly transmits and receives power by using a magnetic resonance method.

BACKGROUND ART

In recent years, development of technology for wirelessly transmitting power (electric energy) without using power cords has been popular. Among the methods of wirelessly transmitting power, a so-called magnetic resonance method is the technology that has been attracting particular attention. The magnetic resonance method was proposed by a research group at the Massachusetts Institute of Technology in 2007. The relevant technique has been disclosed in Patent Document 1 (Jpn. PCT National Publication No. 2009-501510), for example.

In a wireless power transmission system of the magnetic resonance method, the resonance frequency of a power transmission-side antenna is equal to the resonance frequency of a power reception-side antenna; the antennas of a high Q-value (100 or more) are used. Accordingly, the energy is transmitted from the power transmission-side antenna to the power reception-side antenna in an efficient manner. One of the major features is the power transmission distance that can be set to between several tens of centimeters and several meters.

As for the above wireless power transmission system of the magnetic resonance method, a study has been going on to apply the wireless power transmission system to charging vehicle-mounted batteries such as those of electric vehicles (EV) and hybrid electric vehicles (HEV). If such a wireless system can be used for the above vehicles, it is possible to eliminate the need to handle power connectors or power lines when power is to be supplied to the vehicles.

For example, Patent Document 2 (JP2010-68657A) discloses one antenna that is mounted in a bottom surface portion of a moving body such as an electric vehicle; power is wirelessly transmitted from another antenna that is installed on the ground, and the transmitted power is used to charge a battery of the electric vehicle.

[Patent Document 1]
Jpn. PCT National Publication No. 2009-501510
[Patent Document 2]
JP2010-68657A

SUMMARY OF THE INVENTION

Problems to be Solved by the Invention

As described above, if the power transmission system of the magnetic resonance method is used in supplying power to vehicles such as electric vehicles (EV) or hybrid electric vehicles (HEV), the power transmission antenna may be buried in the ground, and the power reception antenna may be laid out in the bottom surface portion of a vehicle.

If the power transmission system is used as described above, the power transmission antenna might not be aligned with and might be slightly away from the power reception antenna, depending on how the vehicle is parked. Even if the power transmission antenna and the power reception antenna are slightly away from positions that give the highest transmission efficiency, the power transmission system is preferably designed to have robustness in order to prevent a plunge in the power transmission efficiency.

However, the robustness has not been taken into account for the conventional power transmission system. The problem is that the power transmission efficiency drops significantly when the power transmission antenna is not aligned with the power reception antenna.

Means for Solving the Problems

To solve the above problems, a power transmission system of the present invention is characterized by including: a power transmission antenna that includes a wound power transmission coil that is placed on the ground; and a power reception antenna that is disposed in such a way as to face the power transmission antenna, includes a wound power reception coil, and receives electric energy from the power transmission antenna via an electromagnetic field, wherein an area of a first projection plane that is formed by the power transmission coil in a vertical direction with respect to a horizontal plane is larger than an area of a second projection plane that is formed by the power reception coil in the vertical direction with respect to the horizontal plane.

Moreover, the power transmission system of the present invention is characterized in that, when a distance between inner edges of the power transmission coil in a predetermined direction is represented by $T_i$, a distance between outer edges of the power transmission coil by $T_o$, a distance between inner edges of the power reception coil by $R_i$, and a distance between outer edges of the power reception coil by $R_o$, there is relation $T_i < R_i < R_o < T_o$.

Moreover, the power transmission system of the present invention is characterized in that the predetermined direction is a direction perpendicular to a direction in which a positional shift occurs between the power reception antenna and the power transmission antenna.

Advantages of the Invention

In the power transmission system of the present invention, even if there is a slight shift from the positions of the power transmission antenna and the power reception antenna that give the highest transmission efficiency, the power transmission system is designed to have robustness in order to prevent a plunge in the power transmission efficiency. Therefore, even if there is a positional shift of the power reception antenna with respect to the power transmission antenna, this configuration prevents a plunge in the power transmission efficiency.

BEST MODE FOR CARRYING OUT THE INVENTION

Figure 1:
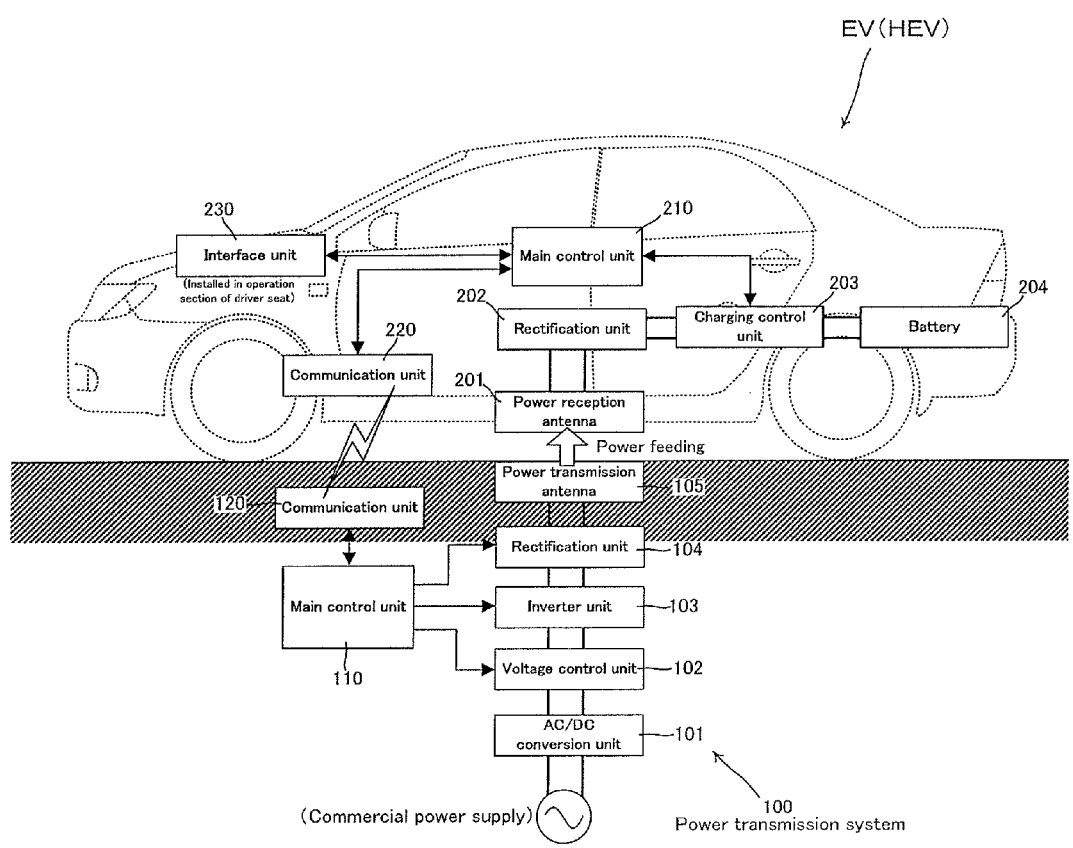
FIG. 1 is a block diagram of a power transmission system according to an embodiment of the present invention.

Hereinafter, embodiments of the present invention will be described with reference to the accompanying drawings. FIG. 1 is a block diagram of a power transmission system according to an embodiment of the present invention. Incidentally, an antenna of the present invention can be applied to both a power reception-side antenna and a power transmission-side antenna that make up the power transmission system. In the embodiment described below, what is described is an example in which the antenna of the present invention is applied to the power reception-side antenna.

The power transmission system that uses the antenna of the present invention is expected to be a system for charging vehicles such as electric vehicles (EV) or hybrid electric vehicles (HEV), for example. The power transmission system transmits power to the above vehicles in a non-contact manner. Accordingly, the power transmission system is installed in a parking space where the vehicles can be parked. A user of a vehicle stops a vehicle in the parking space where the power transmission system is installed, in such a way that a power reception antenna 201, which is mounted in the vehicle, faces the power transmission antenna 105. In this manner, the vehicle receives power from the power transmission system.

In the power transmission system, when power is efficiently transmitted from the power transmission antenna 105 of the power transmission system 100 to the power reception antenna 201 of a power reception-side system 200, a resonance frequency of the power transmission antenna 105 is set equal to a resonance frequency of the power reception antenna 201. As a result, from the power transmission-side antenna to the power reception-side antenna, energy can be transmitted efficiently.

An AC/DC conversion unit 101 of the power transmission system 100 is a converter that converts commercial power supply, which is input, into constant direct current. The output from the AC/DC conversion unit 101 may be boosted by a voltage control unit 102 to a predetermined voltage. The setting of the voltage generated by the voltage control unit 102 can be controlled through a main control unit 110.

Figure 2:
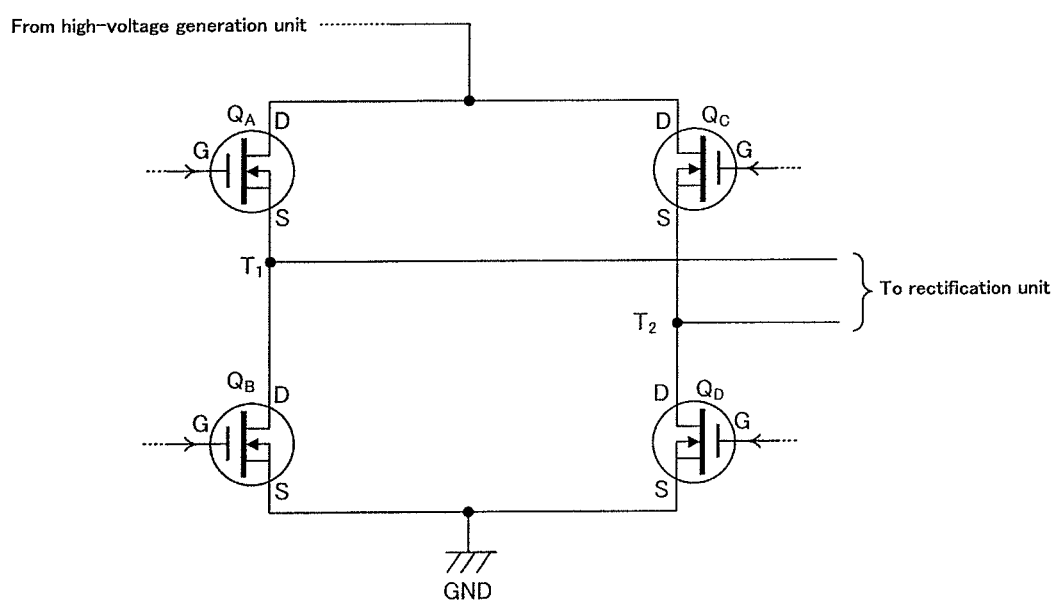
FIG. 2 is a diagram showing an inverter unit of the power transmission system.

An inverter unit 103 generates a predetermined AC voltage from the voltage supplied from the voltage control unit 102, and inputs the predetermined AC voltage to a matching unit 104. FIG. 2 is a diagram showing the inverter unit of the power transmission system. The inverter unit 103 includes four field-effect transistors (FET) $Q_A$ to $Q_D$, which are connected by full-bridge method, for example, as shown in FIG. 2.

According to the present embodiment, between a connection portion T1 between the switching elements $Q_A$ and $Q_B$ that are connected in series, and a connection portion T2 between the switching elements $Q_C$ and $Q_D$ that are connected in series, the matching unit 104 is connected. When the switching elements $Q_A$ and $Q_D$ are on, the switching elements $Q_B$ and $Q_C$ are off. When the switching elements $Q_B$ and $Q_C$ are on, the switching elements $Q_A$ and $Q_D$ are off. As a result, between the connection portions T1 and T2, rectangular-wave AC voltage is generated. Incidentally, in the case of the present embodiment, the frequency of the rectangular wave generated by the switching of each of the switching elements is in the range of about 20 kHz to several thousand kilohertz.

A drive signal for the switching elements $Q_A$ to $Q_D$ that constitute the above inverter unit 103 is input from the main control unit 110. The frequency that is used to drive the inverter unit 103 can be controlled from the main control unit 110.

The matching unit 104 includes a passive element having a predetermined circuit constant. The output from the inverter unit 103 is input to the matching unit 104. The output from the matching unit 104 is supplied to the power transmission antenna 105. The circuit constant of the passive element that constitutes the matching unit 104 can be adjusted based on a command from the main control unit 110. The main control unit 110 issues a command to the matching unit 104 in such a way that the power transmission antenna 105 resonates with the power reception antenna 201. Incidentally, the matching unit 104 is not an essential component.

The power transmission antenna 105 includes a coil having an inductive reactance component. The power transmission antenna 105 resonates with the vehicle-mounted power reception antenna 201 when the vehicle-mounted power reception antenna 201 is disposed in such a way as to face the power transmission antenna 105. As a result, the electric energy output from the power transmission antenna 105 can be transmitted to the power reception antenna 201.

The main control unit 110 of the power transmission system 100 is a general-purpose information processing unit that includes CPU, ROM, which keeps a program that runs on the CPU, and RAM, which is the work area for the CPU. The main control unit 110 works cooperatively with each of components that are connected to the main control unit 110 as shown in the diagram.

A communication unit 120 is configured to wirelessly communicate with a vehicle-side communication unit 220 and to transmit data to the vehicle or receive data from the vehicle. Data received by the communication unit 120 is transferred to the main control unit 110. The main control unit 110 can transmit predetermined information to the vehicle via the communication unit 120.

The structure provided in the vehicle will be described. In the vehicle's power reception-side system, the power reception antenna 201 resonates with the power transmission antenna 105 and thereby receives electric energy output from the power transmission antenna 105. The power reception antenna 201 is mounted in the bottom surface portion of the vehicle.

The AC power received by the power reception antenna 201 is rectified by a rectification unit 202. The rectified power is accumulated in a battery 204 via a charging control unit 203. The charging control unit 203 controls the charging of the battery 204 based on a command from a main control unit 210. More specifically, the output from the rectification unit 202 is stepped up or down by the charging control unit 203 to a predetermined voltage value, before being accumulated in the battery 204. The charging control unit 203 is also configured to manage the amount of electricity remaining in the battery 204.

The main control unit 210 is a general-purpose information processing unit that includes CPU, ROM, which keeps a program that runs on the CPU, and RAM, which is the work area for the CPU. The main control unit 210 works cooperatively with each of components that are connected to the main control unit 210 as shown in the diagram.

An interface unit 230 is provided in a driver seat portion of a vehicle. The interface unit 230 provides predetermined information and the like to a user (driver), or accepts operation and input from a user. The interface unit 230 includes a display device, buttons, a touch panel, a speaker, and the like. When a predetermined operation is performed by a user, operation data is transmitted from the interface unit 230 to the main control unit 210 and is then processed. To provide predetermined information to a user, display command data is transmitted from the main control unit 210 to the interface unit 230 in order to display the predetermined information.

The vehicle-side communication unit 220 wirelessly communicates with the power transmission-side communication unit 120. The configuration makes it possible to exchange data with the power transmission-side system. The data received by the communication unit 220 is transferred to the main control unit 210. The main control unit 210 can transmit predetermined information to the power transmission system's side via the communication unit 220.

In the power transmission system, a user who wants to receive power parks his/her vehicle in a parking space where the above-described power transmission-side system is installed. The user inputs a command via the interface unit 230 to ask for charging. In response, the main control unit 210 acquires, from the charging control unit 203, the amount of electricity remaining in the battery 204, and calculates the amount of power required to charge the battery 204. The information that indicates the calculated amount of power and requests transmission of power is transmitted from the vehicle-side communication unit 220 to the communication unit 120 of the power transmission-side system. After receiving the information, the main control unit 110 of the power transmission-side system controls the voltage control unit 102, the inverter unit 103, and the matching unit 104 in order to transmit power to the vehicle's side.

The specific configuration of an antenna that is used in the power transmission system 100 having the above-described configuration will be described. What will be described below is an example in which the power reception antenna 201 adopts the configuration of the present invention. However, the antenna of the present invention may also be applied to the power transmission antenna 105.

Figure 3:
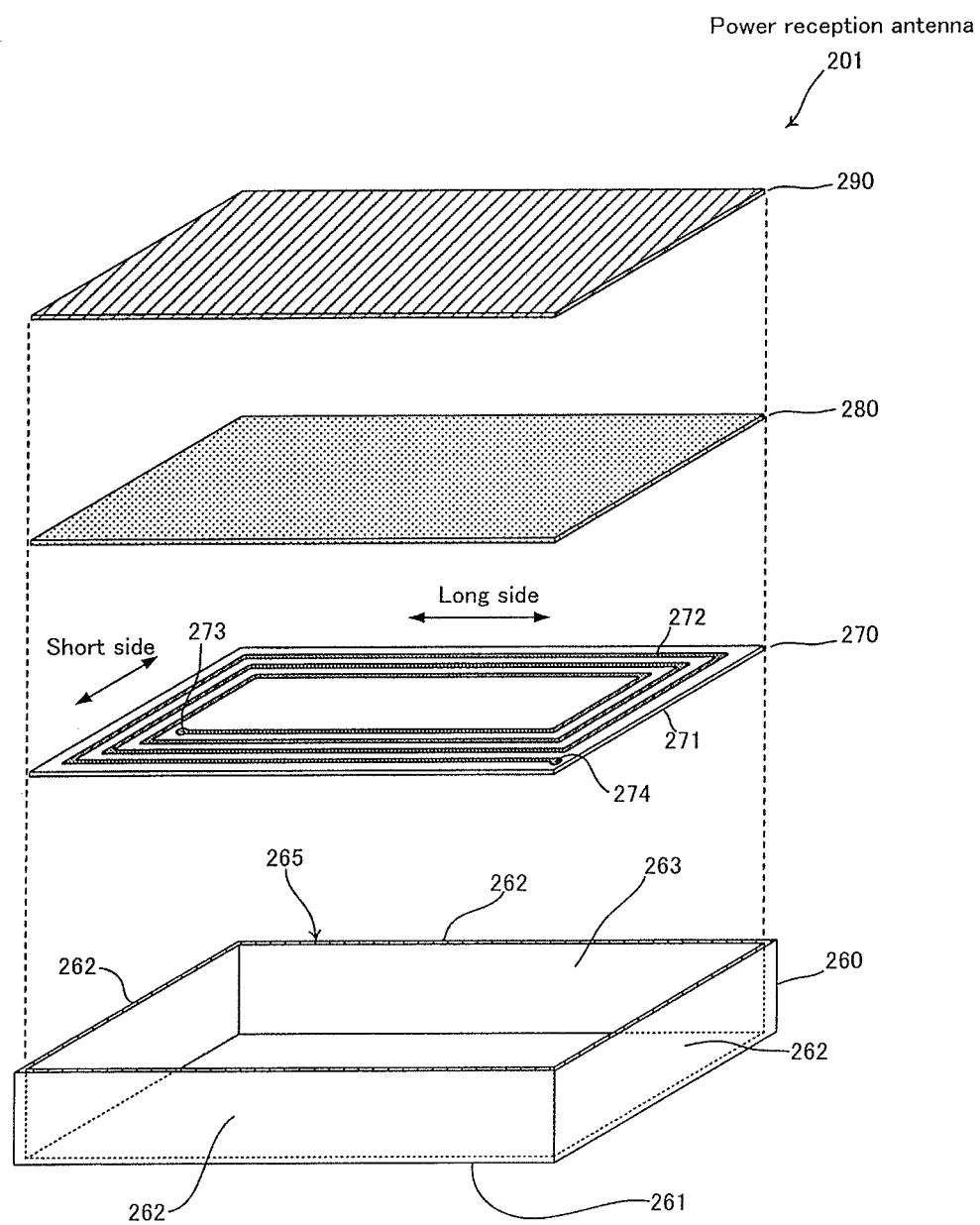
FIG. 3 is an exploded perspective view of a power transmission antenna 105 (power reception antenna 201).
Figure 4:
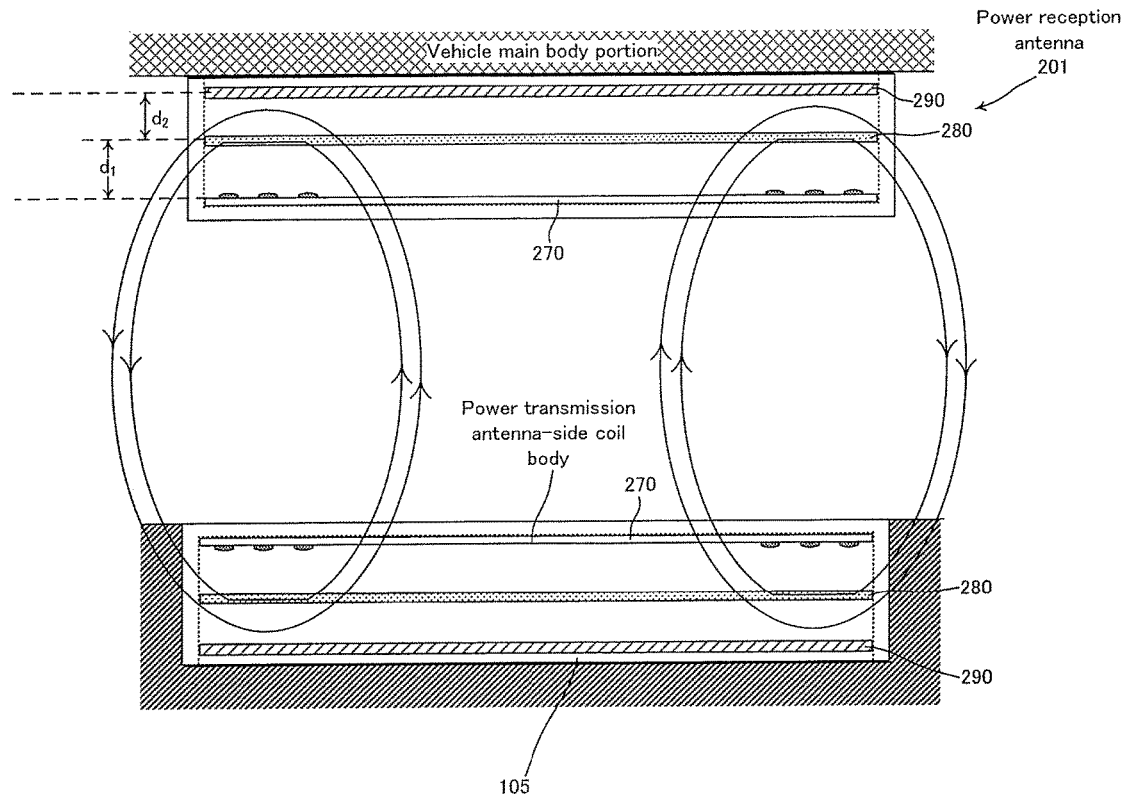
FIG. 4 is a schematic cross-sectional view showing how power is transmitted by the power reception antenna 201 and the power reception antenna 201.

FIG. 3 is an exploded perspective view of the power transmission antenna 105 (power reception antenna 201) according to the embodiment of the present invention. FIG. 4 is a schematic cross-sectional view showing how power is transmitted by the power transmission antenna 105 and the power reception antenna 201 according to the embodiment of the present invention. In FIG. 4, arrows schematically represent magnetic field lines.

Incidentally, in the embodiment described below, what will be described is an example in which a coil body 270 in the power transmission antenna 105 or power reception antenna 201 is in the shape of a rectangular flat plate. However, the antenna of the present invention is not limited to a coil of such a shape. For example, as the coil body 270, a coil that is in the shape of a circular flat plate is also available. The coil body 270 functions as a magnetic resonance antenna section in the power transmission antenna 105 or power reception antenna 201. The "magnetic resonance antenna section" includes not only an inductance component of the coil body 270, but also a capacitance component that is based on the stray capacitance thereof, or a capacitance component that is based on an intentionally added capacitor.

Incidentally, in the power transmission system 100 of the present invention, circuit constants (inductance component, capacitance component) of the power transmission antenna 105 are intentionally set different from circuit constants of the power reception antenna 201 in order to improve the transmission efficiency. In order to make the circuit constants of the power transmission antenna 105 different from the circuit constants of the power reception antenna 201, the coil bodies 270 and other components that are generally identical in shape are used, but the coil bodies 270 and other components are different in size, for example.

A case body 260 is used to house the coil body 270, which has an inductive reactance component of the power reception antenna 201. For example, the case body 260 is made of resin such as polycarbonate, and is formed into a box shape with an opening. From each side of a rectangular bottom plate portion 261 of the case body 260, a side plate portion 262 is provided in such a way as to extend in a direction perpendicular to the bottom plate portion 261. In an upper portion of the case body 260, an upper opening portion 263 is formed in such a way as to be surrounded by the side plate portions 262. The power reception antenna 201 that is packaged in the case body 260 is attached to a vehicle main body portion through the upper opening portion 263's side. In order to attach the case body 260 to the vehicle main body portion, any conventional, well-known method can be used. Incidentally, in order to enhance the attachment of the case body 260 to the vehicle main body portion, a flange member or the like may be provided around the upper opening portion 263.

The coil body 270 includes a rectangular flat plate-shaped substrate 271, which is made of glass epoxy, and a spiral conductive portion 272, which is formed on the substrate 271. To a first end portion 273 of an inner peripheral side of the spiral conductive portion 272, and to a second end portion 274 of an outer peripheral side thereof, conductive lines, not shown, are electrically connected. Accordingly, the power received by the power reception antenna 201 is led to the rectification unit 202. The coil body 270 is placed on the rectangular bottom plate portion 216 of the case body 260, and is fixed to the bottom plate portion 216 through an appropriate fixing means.

Above the coil body 270, a ferrite substrate 280 is disposed in such a way as to be a first distance $d_1$ away from the coil body 270. It is preferred that the ferrite substrate 280 be large in specific resistance and in magnetic permeability and small in magnetic hysteresis. The ferrite substrate 280 is fixed to the case body 260 through an appropriate means; the ferrite substrate 280 is therefore disposed above the coil body 270 in such a way as to create the space of the first distance $d_1$. This layout increases the rate at which the magnetic field lines that are generated at the power transmission antenna 105's side pass through the ferrite substrate 280. Therefore, in the transmission of power from the power transmission antenna 105 to the power reception antenna 201, the effects of metal objects that constitute the vehicle main body portion on the magnetic field lines can be reduced.

In the upper opening portion 263 of the case body 260, a rectangular flat plate-shaped aluminum substrate 290 is disposed above the ferrite substrate 280 in such a way as to cover the upper opening portion 263 and to be a second distance $d_2$ away from the ferrite substrate 280. The aluminum substrate 290 may be made of any metal other than aluminum.

According to the present embodiment, the aluminum substrate 290 is disposed in such a way as to cover the upper opening portion 263. Therefore, the effect of the vehicle main body metal portion on the coil body 270 can be reduced, and the characteristics of the reception antenna 201 can be determined as an antenna. According to the present embodiment, since the characteristics of the antenna have been determined, it is possible to anticipate the same power transmission characteristics regardless of what type of vehicle the reception antenna 201 is mounted on. As a result, the versatility of the antenna can be increased.

According to the present embodiment, the power reception antenna 201 is mounted on the vehicle main body portion through a vehicle body mounting portion 265 that is located at the upper opening portion 263. As the structure of the vehicle body mounting portion 265, a conventional, well-known structure can be appropriately used. Incidentally, in order to enhance the attachment of the power reception antenna 201 to the vehicle main body portion, a flange member or the like may be provided around the upper opening portion 263.

As described above, the antenna of the present invention includes the coil body 270 on which the predetermined conductive portion 272 is formed on the insulating substrate 271 having a main surface; the ferrite substrate 280 that is disposed above the coil body 270 in such a way as to be the first distance $d_1$ away from the coil body 270; the aluminum substrate 290 that is disposed above the ferrite substrate 280 in such a way as to be the second distance $d_2$ away from the ferrite substrate 280; and the vehicle body mounting portion 265 that is disposed above the aluminum substrate 290.

Figure 5:
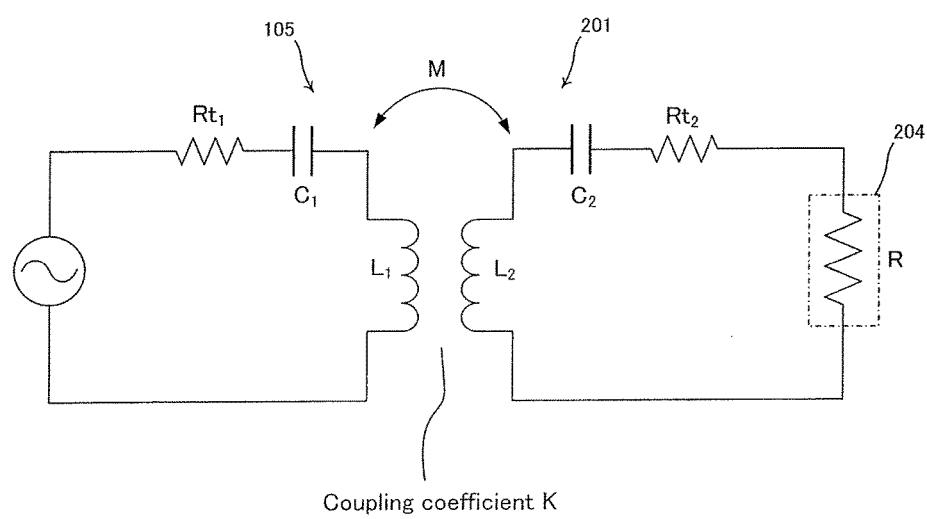
FIG. 5 is a diagram showing an equivalent circuit of a power transmission system 100 according to an embodiment of the present invention.

Then, the circuit constants (inductance component, and capacitance component) of the power transmission antenna 105 and power reception antenna 201 that are formed as described above will be described. FIG. 5 is a diagram showing an equivalent circuit of the power transmission system 100 according to the embodiment of the present invention.

In the equivalent circuit shown in FIG. 5, the inductance component of the power transmission antenna 105 is represented by $L_1$, the capacitance component thereof is represented by $C_1$, and the resistance component thereof is represented by $Rt_1$; the inductance component of the power reception antenna 201 is represented by $L_2$, the capacitance component thereof is represented by $C_2$, and the resistance component thereof is represented by $Rt_2$. The mutual inductance between the power transmission antenna 105 and the power reception antenna 201 is represented by M. The internal resistance of the battery 204 is represented by R. The coupling coefficient between the power transmission antenna 105 and the power reception antenna 201 is represented by k.

According to the present embodiment, suppose that the power transmission antenna 105 constitutes a series resonator with an inductance component of $L_1$ and a capacitance component of $C_1$. Moreover, suppose that the power reception antenna 201 constitutes a series resonator with an inductance component of $L_2$ and a capacitance component of $C_2$.

In the power transmission by the magnetic resonance method, when power is efficiently transmitted from the power transmission antenna 105 of the power transmission system 100 to the power reception antenna 201 of the power reception-side system 200, the resonance frequency of the power transmission antenna 105 is set equal to the resonance frequency of the power reception antenna 201. As a result, from the power transmission-side antenna to the power reception-side antenna, energy can be transmitted efficiently. The condition for this can be expressed by the following formula (1):

[Formula 1]

$$\frac{1}{2\pi\sqrt{L_1 C_1}} = \frac{1}{2\pi\sqrt{L_2 C_2}} \tag{1}$$

If the relation is expressed only by inductance component $L_1$, capacitance component $C_1$, inductance component $L_2$, and capacitance component $C_2$, this can be summarized as the following formula (2):

[Formula 2]

$$L_1 C_1 = L_2 C_2 \tag{2}$$

Moreover, the impedance of the power transmission antenna 105 is represented by the following formula (3), and the impedance of the power reception antenna 201 by the following formula (4). Incidentally, in this specification, the values defined by the following formulae (3) and (4) are defined as the impedance of respective antennas.

[Formula 3]

$$k\sqrt{\frac{L_1}{C_1}} \tag{3}$$

[Formula 4]

$$k\sqrt{\frac{L_2}{C_2}} \tag{4}$$

In the power reception-side system of the power transmission system 100 of the magnetic resonance method, if the battery 204 shifts to a constant voltage charging mode, the input impedance is changed by the charging power because the voltage of the battery 204 is constant. When the charging power for the battery 204 is large, the input impedance is low. When the charging power is small, the input impedance is high. In terms of efficiency, it is desirable that the impedance of the power reception-side power reception antenna 201 be set closer to the input impedance based on the charging power for the battery 204.

Meanwhile, the input impedance to the power transmission antenna 105 when seen from a power source at the power transmission side should be as high as possible, in terms of efficiency. The reason is that the internal resistance of the power source causes a loss that is proportional to the square of the current.

Accordingly, between the impedance of the power transmission antenna 105 represented by the formula (3) and the impedance of the power reception antenna 201 represented by the formula (4), it is desirable that the relation of the following formula (5) be satisfied:

[Formula 5]

$$k\sqrt{\frac{L_1}{C_1}} > k\sqrt{\frac{L_2}{C_2}} \quad (5)$$

If the relation is expressed only by inductance component $L_1$, capacitance component $C_1$, inductance component $L_2$, and capacitance component $C_2$, this can be summarized as the following formula (6):

[Formula 6]

$$\frac{L_1}{C_1} > \frac{L_2}{C_2} \quad (6)$$

As described above, in the power transmission system 100 of the present invention, the circuit constants of the power transmission antenna 105 and the circuit constants of the power reception antenna 201 satisfy the above formulae (2) and (6). Therefore, when the battery 204 is charged in the power reception-side system, power can be transmitted efficiently.

Given the inductance components in the circuit constants of the power transmission antenna 105 and the circuit constants of the power reception antenna 201, in order to satisfy each of the relations such as the above formulae (2) and (6), the size and layout of the spiral conductive portion 272 formed on the substrate 271, as well as auxiliary members such as magnetic bodies, may be adjusted.

More specifically, the pattern of the conductive portion 272 shown in FIG. 3 will be described. The long or short side, or both, of the conductive portion 272 of the power transmission antenna 105 may be made greater than those of the power reception antenna 201, so that the total length of the conductive portion 272 becomes longer; or the number of turns in the conductive portion 272 of the power transmission antenna 105 may be made larger than that of the power reception antenna 201; or a magnetic body, such as ferrite, may be added to an appropriate position in the power transmission antenna 105.

Furthermore, the relation with the internal impedance of the battery 204 will also be described. In the power reception-side system, the condition for efficiently charging the battery 204 is that the impedance of the power reception antenna 201 matches the impedance of the battery 204.

That is, according to the present embodiment, in addition to the conditions of the formulae (2) and (6), the following relation is established between the impedance of the power reception antenna 201 of the formula (4) and the impedance R of the battery 204:

[Formula 7]

$$R = k\sqrt{\frac{L_2}{C_2}} \quad (7)$$

Therefore, when the battery 204 is charged in the power reception-side system, power can be transmitted efficiently in the system as a whole.

The antenna that can be used in the power transmission system 100 of the present invention is not limited to those described above.

For example, in the power transmission system 100 of the present invention, an antenna that uses a spider coil may also be preferably used. Hereinafter, the specific configuration of such an antenna will be described. The antenna can be applied to both the power transmission antenna 105 and the power reception antenna 201. Incidentally, the antenna that transmits power using the magnetic resonance method includes not only an inductance component of the coil, but also a capacitance component that is based on the stray capacitance thereof, or a capacitance component that is based on an intentionally added capacitor.

Figure 6:
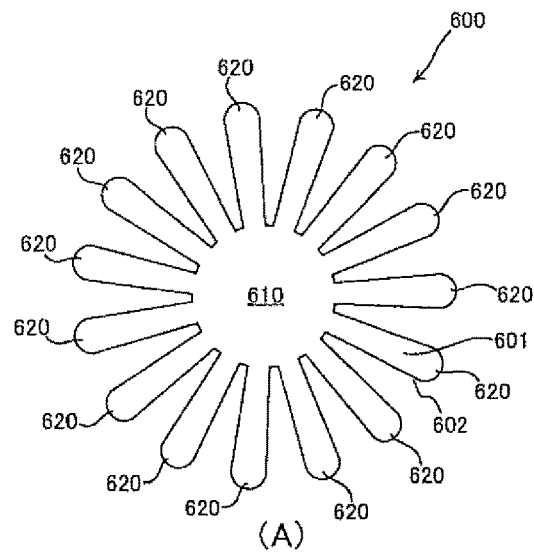
FIG. 6 is a diagram for explaining a spider coil that is used in an antenna according to another embodiment of the present invention.
Figure 6:
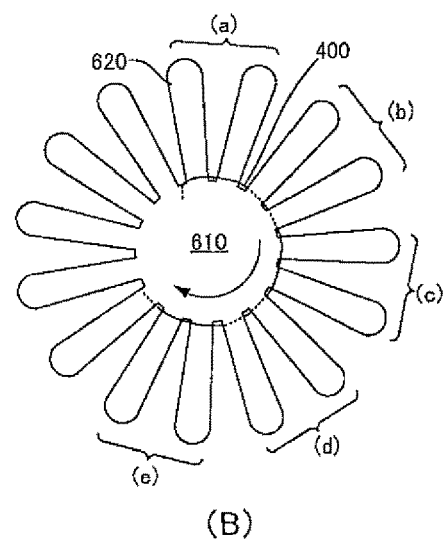
Figure 6:
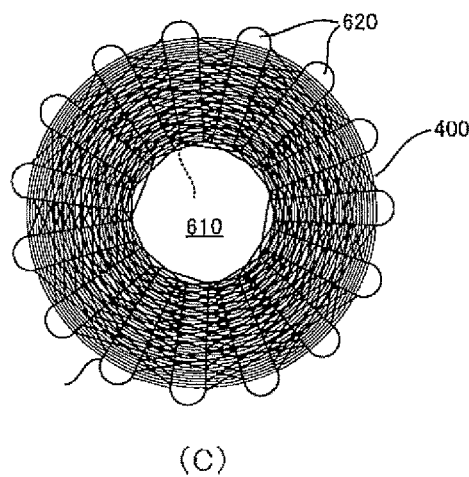

FIG. 6 is a diagram for explaining a spider coil that is used in an antenna according to another embodiment of the present invention. FIG. 6A is a diagram showing a substrate 600 that is used to make the shape of the spider coil. FIG. 6B is a diagram showing one example of a pattern when a conductor line 400 is wound around the substrate 600. FIG. 6C is a diagram showing the spider coil.

In the diagram shown in FIG. 6A, what is described is an example in which the substrate 600 is substantially circular. However, the substrate 600 is not limited to this.

The substrate 600 is a board-like member having a first surface 601 and a second surface 602, which is the back side of the first surface 601. For example, the substrate 600 is preferably made of material that is small in dielectric loss tangent, such as polycarbonate or polypropylene.

The substrate 600 includes a base portion 610, which is an almost circular flat plate portion, and a plurality of coil-shaping projecting pieces 620, which extend radially from the base portion 610.

The coil-shaping projecting pieces 620 are used to hold the conductor line 400 in an engaged state, as the conductor line 400 passes over either the first surface 601 or the second surface 602. Therefore, the shape of the spider coil is kept by the conductor line 400.

With reference to FIG. 6B, one example of the winding pattern of the conductor line 400 when the shape is formed by the above substrate 600 will be described. It is preferred that the conductor line 400 used be a stranded wire, or a collection of a plurality of conductor wires.

In FIG. 6B, the arrow indicates the order the coil is wound. For example, the conductor line 400 is put in an engaged state on the coil-shaping projecting pieces 620 indicated by (a) in the diagram, at a time when the winding of the conductor line 400 starts. At this time, on the two coil-shaping projecting pieces 620 indicated by (a), the conductor line 400 is held by the first surface 601's side of the coil-shaping projecting pieces 620.

Then, over the two coil-shaping projecting pieces 620 indicated by (b), the conductor line 400 is held by the second surface 602's side of the coil-shaping projecting pieces 620.

On the two coil-shaping projecting pieces 620 indicated by (c), the conductor line 400 is held by the first surface 601's side of the coil-shaping projecting pieces 620.

As described above, the surface that holds the conductor line 400 is changed every two coil-shaping projecting pieces 620, from the first surface 601's side to the second surface 602's side and then from the second surface 602's side to the first surface 601's side. The conductor line 400 is wound in that winding pattern, like (c)→(d)→(e)→ .... That winding pattern makes it possible to form an antenna with a large inductance component L.

Conversely, in order to form an antenna with a large inductance component L, the surface that holds the conductor line 400 is changed every coil-shaping projecting piece 620, from the first surface 601's side to the second surface 602's side and then from the second surface 602's side to the first surface 601's side. Such a winding pattern is preferred.

FIG. 6C is a diagram showing a spider coil that is used in an antenna according to another embodiment of the present invention. Such an antenna may be used as the power transmission antenna 105 or the power reception antenna 201 in order to realize the present invention.

As described above, if the power transmission system is used to supply power to vehicles such as electric vehicles (EV) or hybrid electric vehicles (HEV), it is expected that the power transmission antenna 105 will be installed in such a way as to be buried in the ground, and that the power reception antenna 201 will be laid out in the bottom surface portion of a vehicle.

If the power transmission system is used in that way, the power transmission antenna 105 might not be aligned with and might be slightly away from the power reception antenna 201, depending on how the vehicle is parked. Even if the power transmission antenna 105 and the power reception antenna 201 are slightly away from positions that give the highest transmission efficiency, the power transmission system is preferably designed to have robustness in order to prevent a plunge in the power transmission efficiency.

However, the robustness has not been taken into account for the conventional power transmission system. The problem is that the power transmission efficiency drops significantly when the power transmission antenna 105 is not aligned with the power reception antenna 201.

The present embodiment proposes the configuration for preventing a decline in the power transmission efficiency resulting from a positional shift of the power reception antenna 201 with respect to the power transmission antenna 105.

Figure 7:
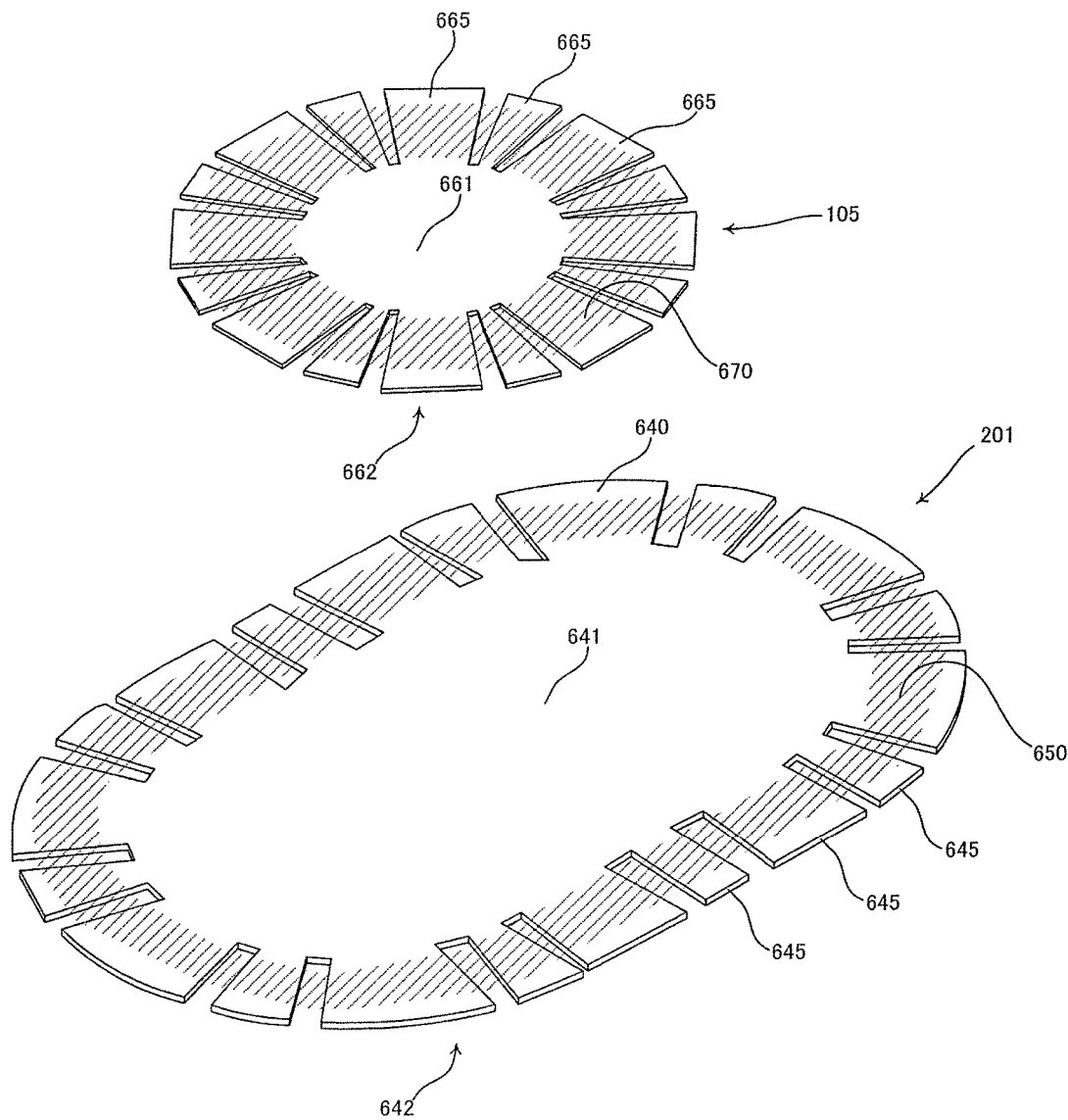
FIG. 7 is a diagram showing an example of the configuration of an antenna according to another embodiment of the present invention.
Figure 8:
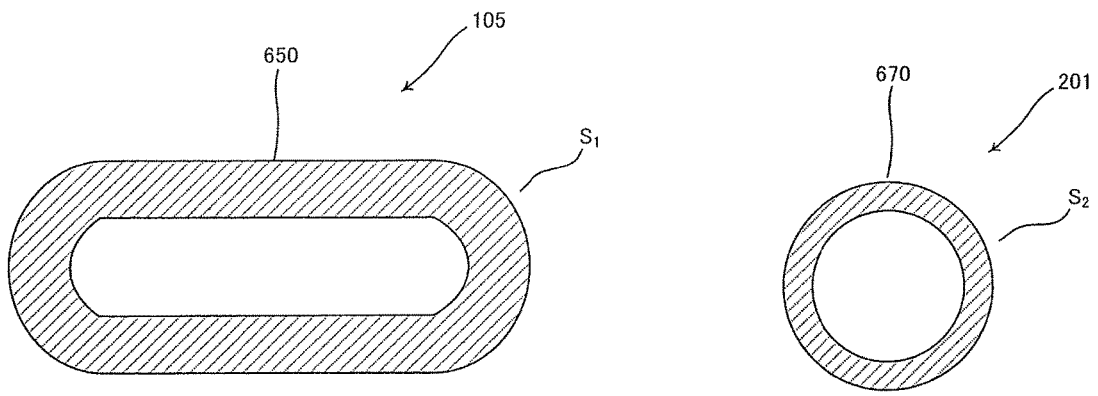
FIG. 8 is a plan view of a power transmission coil and power reception coil of an antenna according to another embodiment of the present invention.
Figure 8:
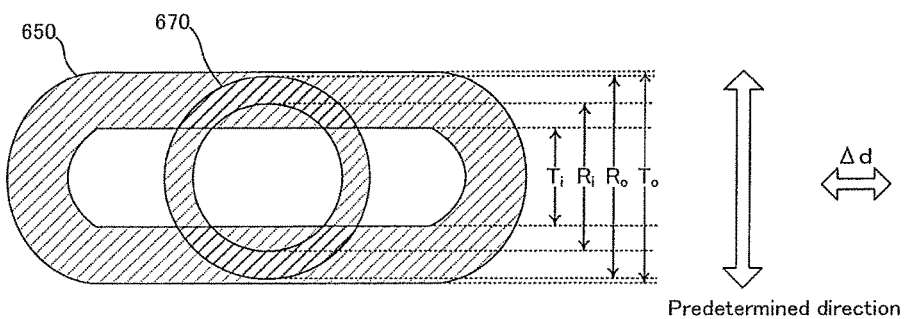
Figure 8:
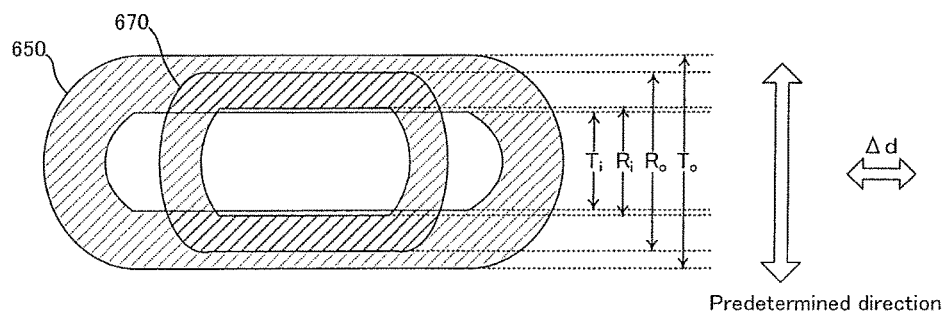

FIG. 7 is a diagram showing an example of the configuration of an antenna according to another embodiment of the present invention. FIG. 8 is a plan view of a power transmission coil 650 (A) and power reception coil 670 (B) of an antenna according to another embodiment of the present invention.

FIG. 8C is a plan view of the power transmission coil 650 and power reception coil 670 when there is no positional shift of the power reception antenna 201 with respect to the power transmission antenna 105.

FIG. 8D is a plan view of the power transmission coil 650 and power reception coil 670 when there is no positional shift of the power reception antenna 201 with respect to the power transmission antenna 105 and when a race track-shaped coil is used even in the power reception antenna 201.

Figure 9:
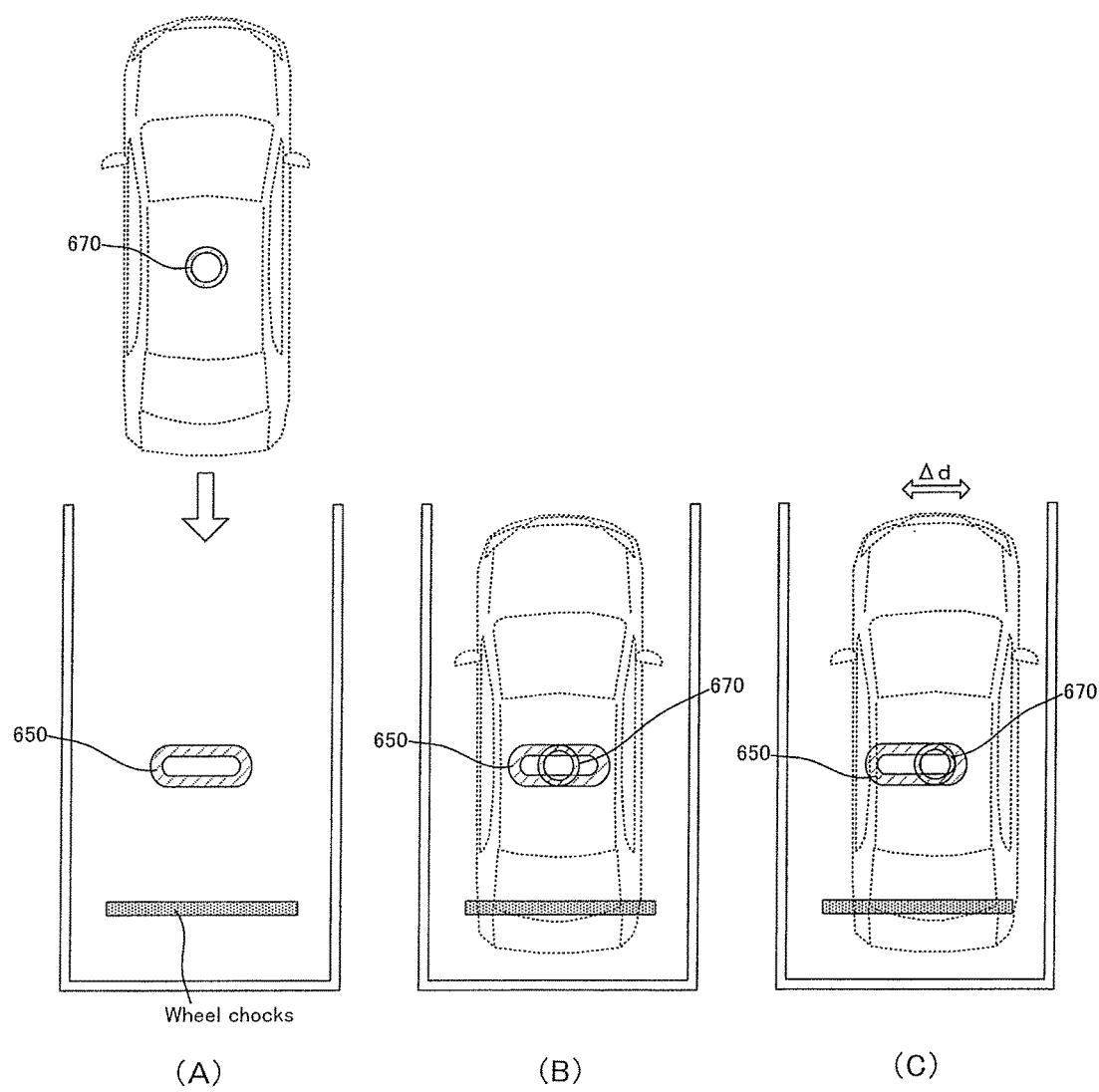
FIG. 9 is a diagram showing an application example of an antenna according to another embodiment of the present invention.

FIG. 9 is a diagram showing an application example of an antenna according to another embodiment of the present invention, showing only the power transmission coil 650 of the power transmission antenna placed on the ground, as well as the power reception coil 670 of the power reception antenna mounted on the vehicle.

In FIGS. 7 and 8, the shaded areas represent portions where a coil of an antenna is formed. FIG. 7 is a perspective view of the situation where the power transmission antenna 105 and the power reception antenna 201 are disposed in such a way as to face each other when power is to be transmitted.

According to the present embodiment, the power transmission antenna 105 employs a race track-shaped power transmission coil 650, and the power reception antenna 201 employs an annular power reception coil 670. However, according to the present invention, the power transmission coil 650 and the power reception coil 670 are not limited to those shapes. For example, as shown in FIG. 8D, the power reception coil 670 may be a race track-shaped coil; or both the power transmission coil 650 and the power reception coil 670 may be an annular coil.

The power transmission coil 650 of the power transmission antenna 105 includes a conductor line 400 that is held by coil-shaping projecting pieces 645 of a substrate 640 that has a first surface 641 and a second surface 642, which is the back side of the first surface 641.

Similarly, the power reception coil 670 of the power reception antenna 201 includes a conductor line 400 that is held by coil-shaping projecting pieces 665 of a substrate 660 that has a first surface 661 and a second surface 662, which is the back side of the first surface 661.

The method described in FIG. 6 may be used to wind the conductor lines 400 around the above substrates 640 and 660 in order to form the coils.

However, in the case of the spider coil described in FIG. 6, when the conductor line 400 is wound around the coil-shaping projecting pieces 645 (or coil-shaping projecting pieces 665), what has been described is the winding pattern by which: the surface that holds the conductor line 400 is changed every two consecutive coil-shaping projecting pieces 645 (or coil-shaping projecting pieces 665), like first surface→second surface→first surface→ .... However, the present invention is not limited to this. Another winding pattern that can be employed is as follows: the surface that holds the conductor line 400 is changed every coil-shaping projecting piece 645 (or coil-shaping projecting piece 665), like first surface→second surface→first surface→ ....

In general, when the former winding pattern is used to form the coil, this pattern enables a more densely winding of the conductor line 400. When the latter winding pattern is used to form the coil, this pattern enables a more sparsely winding of the conductor line 400. Incidentally, in this specification, as the conductor line 400 is wound more densely with the same space, the resultant coil is defined as having a higher winding density. According to the present embodiment, the "winding density" is proportional to the number of turns per unit width (or length). However, the concept of the "winding density" also includes cases where the winding density is proportional to the number of turns per unit area.

FIG. 9A shows how a vehicle is parked in a charging equipment installation space before the power transmission system of the present invention supplies power to the vehicle. In this example, wheel chocks prevent a positional shift between the antennas from occurring in an up-down direction in the diagram. FIG. 9B shows the positional relation between the power transmission antenna 105 and the power reception antenna 201 that gives the highest transmission efficiency, after the vehicle is parked. FIG. 9C shows a shift from the positional relation between the power transmission antenna 105 and the power reception antenna 201 that gives the highest transmission efficiency, after the vehicle is parked. In this example, because the above-described wheel chocks are provided, as for the positional relation between the power transmission antenna 105 and the power reception antenna 201, a positional shift Δd is expected to occur in the direction indicated by arrow of FIG. 9C.

In the above-described power transmission system, even if there is a slight shift from the positions of the power transmission antenna 105 and the power reception antenna 201 that give the highest transmission efficiency, the power transmission system is designed to have robustness in order to prevent a plunge in the power transmission efficiency. According to the present embodiment, the area $S_1$ of a first projection plane that is formed by the power transmission coil 650 in the vertical direction with respect to the horizontal plane is set larger than the area $S_2$ of a second projection plane that is formed by the power reception coil 670 in the vertical direction with respect to the horizontal plane. It was confirmed that, even if there was a positional shift of the power reception antenna 201 with respect to the power transmission antenna 105 as shown in FIG. 9C, that setting prevented a plunge in the power transmission efficiency.

According to the present invention, in addition to the above-described relation between the area $S_1$ of the first projection plane and the area $S_2$ of the second projection plane, the relation described below is preferred: a direction perpendicular to the direction in which the positional shift Δd occurs between the power transmission antenna 105 and the power reception antenna 201 is referred to as a predetermined direction, and, when the distance between inner edges of the power transmission antenna 105 in the predetermined direction is represented by $T_i$, the distance between outer edges of the power transmission antenna 105 by $T_o$, the distance between inner edges of the power reception antenna 201 by $R_i$, and the distance between outer edges of the power reception antenna 201 by $R_o$, the relation $T_i < R_i < R_o < T_o$ is preferred. These settings prevent a plunge in the power transmission efficiency even when there is a positional shift between the power transmission antenna 105 and the power reception antenna 201. As shown in FIG. 8D, even when race track-shaped coils are used as the power transmission coil 650 and the power reception coil 670, the above relation $T_i < R_i < R_o < T_o$ similarly gives the power transmission system robustness.

Incidentally, the "distance between inner edges" is defined as a maximum distance between inner edges in the predetermined direction. The "distance between outer edges" is defined as a maximum distance between outer edges in the predetermined direction.

It should be also noted that three other features of the present invention are: (1) The shape of the power transmission coil 650 is not similar to the shape of the power reception coil 670; (2) The power transmission coil 650 and power reception coil 670 that are formed by the circling conductor lines 400 are different in mean diameter; and (3) The inner diameter of the power transmission coil 650 should be as small as possible, but the inner diameter is made smaller only to the point where the resistance of the conductor line 400 does not rise beyond the effect of the increasing inductance component $L_1$.

Figure 10:
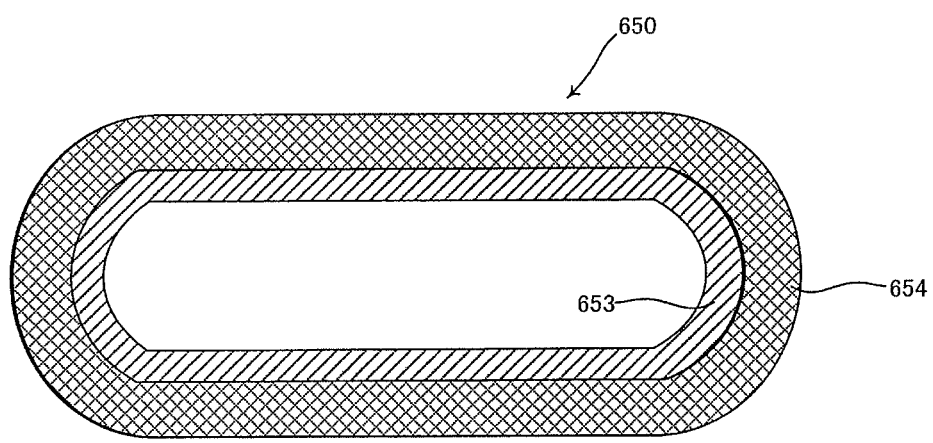
FIG. 10 is a plan view of a power transmission coil of an antenna according to another embodiment of the present invention.

Another embodiment of the present invention will be described. FIG. 10 is a plan view of a power transmission coil 650 of an antenna according to another embodiment of the present invention. Incidentally, in the embodiment below, what is described is an example in which the present invention is applied to the power transmission coil 650 of the power transmission antenna 105. However, the present invention is not limited to this. The present invention may also be applied to the power reception coil 670 of the power reception antenna 201.

According to the present embodiment, even if there is a slight shift from the positions of the power transmission antenna 105 and the power reception antenna 201 that give the highest transmission efficiency, the power transmission system is designed to have robustness in order to prevent a plunge in the power transmission efficiency. That is, an inner peripheral portion 653 of the power transmission coil 650 and an outer peripheral portion 654 of the power transmission coil 650 are different in winding density. More specifically, the winding density of the inner peripheral portion 653 of the power transmission coil 650 is lower than the winding density of the outer peripheral portion 654 of the power transmission coil 650.

One method for achieving a high or low winding density in the inner peripheral portion 653 and outer peripheral portion 654 of the power transmission coil 650 is: to adopt, in the inner peripheral portion 653 of the power transmission coil 650, the winding pattern by which the surface that holds the conductor line 400 is changed every coil-shaping projecting piece 645, like first surface→second surface→first surface→ . . . ; and to adopt, in the outer peripheral portion 654 of the power transmission coil 650, the winding pattern by which the surface that holds the conductor line 400 is changed every two consecutive coil-shaping projecting pieces 645 (or coil-shaping projecting pieces 665), like first surface→second surface→first surface→ . . . . However, the present invention is not limited to such a method. Any method can be used, as long as it is possible to achieve a high or low winding density in the inner peripheral portion 653 and outer peripheral portion 654 of the power transmission coil 650.

As described above, the winding density of the inner peripheral portion 653 of the power transmission coil 650 is made lower than the winding density of the outer peripheral portion 654 of the power transmission coil 650. Therefore, it is possible to produce a smoothed magnetic field. It was confirmed that, even if there was a positional shift of the power reception antenna 201 with respect to the power transmission antenna 105 as shown in FIG. 9C, the above configuration prevented a plunge in the power transmission efficiency.

Figure 11:
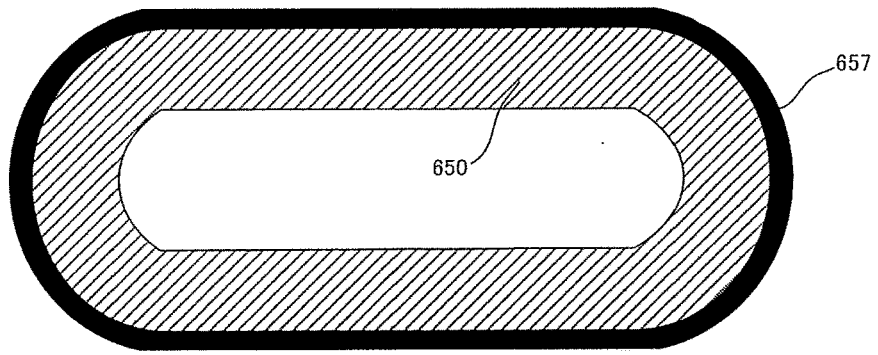
FIG. 11 is a plan view of a power transmission coil of an antenna according to another embodiment of the present invention.

Another embodiment of the present invention will be described. FIG. 11 is a plan view of a power transmission coil 650 of an antenna according to another embodiment of the present invention. Incidentally, in the embodiment below, what is described is an example in which the present invention is applied to the power transmission coil 650 of the power transmission antenna 105. However, the present invention is not limited to this. The present invention may also be applied to the power reception coil 670 of the power reception antenna 201.

According to the present embodiment, even if there is a slight shift from the positions of the power transmission antenna 105 and the power reception antenna 201 that give the highest transmission efficiency, the power transmission system is designed to have robustness in order to prevent a plunge in the power transmission efficiency. That is, on a plane where the power transmission coil 650 is formed, along an entire outer edge of the power transmission coil 650, a high permeability member 657 is disposed. The high permeability member 657 may be made of ferrite. When the high permeability member 657 is disposed across the entire outer edge of the power transmission coil 650, the same advantageous effects as when the area of the power transmission coil 650 substantially becomes larger can be obtained. Even if there is a positional shift of the power reception antenna 201 with respect to the power transmission antenna 105, this configuration prevents a plunge in the power transmission efficiency.

Figure 12:
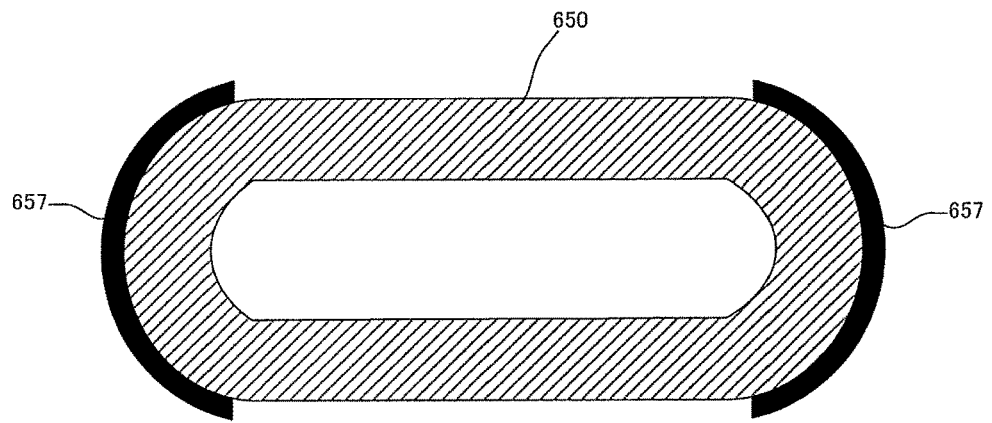
FIG. 12 is a plan view of a power transmission coil of an antenna according to another embodiment of the present invention.
Figure 13:
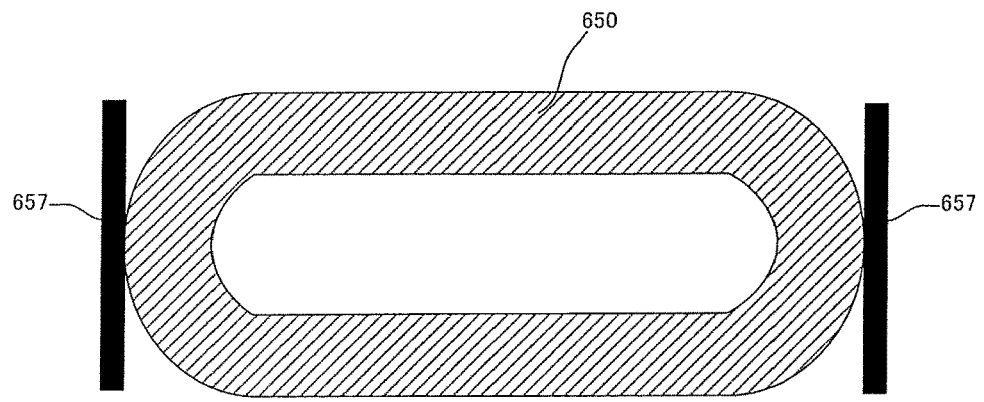
FIG. 13 is a plan view of a power transmission coil of an antenna according to another embodiment of the present invention.

As shown in FIG. 9C, if a positional shift between the power transmission antenna 105 and the power reception antenna 201 is likely to occur only in the lateral direction in the diagram, a pair of high permeability members 657 may be disposed in portions of the outer edge of the power transmission coil 650 where the line is wound in a direction substantially perpendicular to the direction in which the positional shift could occur, as shown in FIGS. 12 and 13. According to the embodiments shown in FIGS. 12 and 13, it is possible to reduce the cost of the high permeability members 657, as well as to obtain robustness.

As described above, even if there is a slight shift from the positions of the power transmission antenna 105 and the power reception antenna 201 that give the highest transmission efficiency, the power transmission system 100 of the present invention is designed to have robustness in order to prevent a plunge in the power transmission efficiency. Even if there is a positional shift of the power reception antenna 201 with respect to the power transmission antenna 105, the configuration prevents a plunge in the power transmission efficiency.

INDUSTRIAL APPLICABILITY

The power transmission system of the present invention is preferably used for a wireless power transmission system of a magnetic resonance method to charge vehicles such as electric vehicles (EV) and hybrid electric vehicles (HEV), which have become increasingly popular in recent years. If the power transmission system is used as described above, the power transmission antenna might not be aligned with and might be slightly away from the power reception antenna, depending on how a vehicle is parked. Even if the power transmission antenna and the power reception antenna are slightly away from positions that give the highest transmission efficiency, the power transmission system is preferably designed to have robustness in order to prevent a plunge in the power transmission efficiency. However, the robustness has not been taken into account for the conventional power transmission system. The problem is that the power transmission efficiency drops significantly when the power transmission antenna is not aligned with the power reception antenna. In the power transmission system of the present invention, even if there is a slight shift from the positions of the power transmission antenna and the power reception antenna, the power transmission system is designed to have robustness in order to prevent a plunge in the power transmission efficiency. Therefore, even if there is a positional shift of the power reception antenna with respect to the power transmission antenna, this configuration prevents a plunge in the power transmission efficiency. Thus, the industrial applicability is very high.

EXPLANATION OF REFERENCE SYMBOLS

100: Power transmission system
101: AC/DC conversion unit
102: Voltage control unit
103: Inverter unit
104: Rectification unit
105: Power transmission antenna
110: Main control unit
120: Communication unit
201: Power reception antenna
202: Rectification unit
203: Charging control unit
204: Battery
210: Main control unit
220: Communication unit
230: Interface unit
260: Case body
216: Bottom plate portion
262: Side plate portion
263: (Upper) opening portion
265: Vehicle body mounting portion
270: Coil body
271: Substrate
272: Conductive portion
273: First end portion
274: Second end portion
280: Ferrite substrate
290: Aluminum substrate
400: Conductor line
600: Substrate
601: First surface
602: Second surface
610: Base portion
620: Coil-shaping projecting piece
640: Substrate
641: First surface
642: Second surface
645: Coil-shaping projecting piece
650: Power transmission coil
653: Inner peripheral portion
654: Outer peripheral portion
657: High permeability member
660: Substrate
661: First surface
662: Second surface
665: Coil-shaping projecting piece
670: Power reception coil

The invention claimed is:

1. A power transmission system comprising:
a power transmission antenna that includes a racetrack-shaped wound power transmission coil, having a long side, that is placed on the ground; and
a power reception antenna that is disposed in such a way as to face the power transmission antenna, includes a wound power reception coil, and receives electric energy from the power transmission antenna via an electromagnetic field, wherein
an area of a first projection plane that is formed by the power transmission coil in a vertical direction with respect to a horizontal plane is larger than an area of a second projection plane that is formed by the power reception coil in the vertical direction with respect to the horizontal plane,
when a distance between inner edges of the power transmission coil in a predetermined direction is represented by $T_i$, a distance between outer edges of the power transmission coil in the predetermined direction is represented by $T_o$, a distance between inner edges of the power reception coil in the predetermined direction is represented by $R_i$, and a distance between outer edges of the power reception coil in the predetermined direction is represented by $R_o$, the following relation is satisfied: $T_i < R_i < R_o < T_o$,
the predetermined direction is a direction perpendicular to a direction in which a positional shift occurs between the power reception antenna and the power transmission antenna, and in the direction in which the positional shift occurs, an internal diameter of the power transmission coil is larger than an internal diameter of the wound power reception coil, such that:

$$\frac{L1}{C1} > \frac{L2}{C2}$$

wherein the inductance component of the power transmission antenna is represented by $L_1$, the capacitance component of the power transmission antenna is represented by $C_1$, the inductance component of the power reception antenna is represented by $L_2$, and the capacitance component of the power reception antenna is represented by $C_2$.

2. The power transmission system according to claim 1, wherein the long side of the race track-shaped wound power transmission coil is parallel to a width of a vehicle in which the power reception antenna is installed, when the vehicle is parked.

\* \* \* \* \*